United States Patent [19]
Bowman et al.

[11] Patent Number: 4,468,847
[45] Date of Patent: Sep. 4, 1984

[54] METHOD OF SEGREGATING METALLIC COMPONENTS

[75] Inventors: Kenneth A. Bowman, Allegheny Township, Westmoreland County, Pa.; Chester L. Zuber, Evansville, Ind.

[73] Assignee: Aluminum Company of America, Pittsburgh, Pa.

[21] Appl. No.: 413,515

[22] Filed: Aug. 31, 1982

[51] Int. Cl.[3] .............................................. B23Q 17/00
[52] U.S. Cl. ....................................... 29/403.4; 241/14
[58] Field of Search ........................... 29/403.4; 241/14

[56] References Cited

U.S. PATENT DOCUMENTS

| | | | |
|---|---|---|---|
| 3,481,020 | 12/1969 | Winter et al. | 29/403.4 |
| 3,538,588 | 11/1970 | Winter et al. | 29/403.4 |
| 3,538,589 | 11/1970 | Winter et al. | 29/403.4 |
| 3,736,896 | 6/1973 | Osborn, Jr. et al. | 113/1 |
| 4,016,003 | 4/1977 | Stauffer | 134/19 |
| 4,119,453 | 10/1978 | Knezevich | 75/0.5 |
| 4,123,294 | 10/1978 | Hanink | 148/13.1 |
| 4,269,632 | 5/1981 | Robertson et al. | 148/2 |
| 4,330,090 | 5/1982 | Montagna et al. | 241/14 |

*Primary Examiner*—Howard N. Goldberg
*Assistant Examiner*—V. K. Rising
*Attorney, Agent, or Firm*—Andrew Alexander

[57] ABSTRACT

A method of detaching and segregating metallic components secured to metallic articles is disclosed. The segregation is made in accordance with the alloy composition of the components. The method comprises the steps of providing articles having at least two components thereon comprised of different aluminum alloys and heating the articles to a temperature sufficiently high to initiate incipient melting of the component having the lowest incipient melting temperature. While at the lowest incipient melting temperature of the aluminum alloy component, the articles are subjected to agitation sufficient to cause the aluminum alloy component having the lowest incipient melting temperature to fracture and detach itself from the article. Thereafter, the detached components are segregated from the remaining articles and recovered.

59 Claims, 5 Drawing Figures

METHOD OF SEGREGATING METALLIC COMPONENTS

BACKGROUND OF THE INVENTION

This invention relates to used containers fabricated at least in part from different metals or alloys, and more particularly, this invention relates to a method or process for reclamation of used containers, such as beverage containers, in a manner which permits recovery or segregation of container components substantially in accordance with their compositions, for example, or composition types.

In the packaging or container field such as the used beverage containers having at least one or more components thereof fabricated from aluminum alloys, there has been ever-increasing interest and extensive research into methods of reclaiming the aluminum components. The interest has been precipitated by the importance of conserving resources and caring for environmental problems. However, heretofore recycling such materials has been greatly hampered by the lack of a method which would be economically attractive. For example, attempts to recycle a beverage can having a body fabricated from one aluminum alloy and a top or lid constructed from a different aluminum alloy often results in an aluminum melt having the composition of neither alloy. Such melt greatly decreases in value because it does not readily lend itself to reuse in the can body or lid without major dilutions, purifications and realloying or other modifications. That is, it can be seen that there is a great need for a method of recycling containers of the type, for example, described wherein the different components thereof are recovered and segregated according to alloy or according to alloy type.

The problem of segregation of different alloys is recognized in U.S. Pat. No. 3,736,896, where there is disclosed the separating of aluminum alloy tops or lids from steel bodied cans by melting a small band of aluminum around the periphery of the can body to provide a separating area allowing separation of the aluminum end from the steel cylindrical body. In this disclosure, induction heating is used to melt the band wherein an encircling inductor surrounds a bead and is connected to a high frequency power supply. However, this approach seems to presume that a used beverage can is not crushed and the end remains perfectly circular. Further, to melt the ends off in this manner would not seem to be economical since the ends would have to be removed individually.

In U.S. Pat. No. 4,016,003, containers having aluminum alloy bodies and lids are shredded to particles in the range of 1 to 1-½ inch and then subjected to temperatures of around 700° F. to remove paints and lacquers. In addition, U.S. Pat. No. 4,269,632 indicates that since the conventional alloys for can ends, e.g. Aluminum Association (AA alloy) 5182, 5082 or 5052, and for can bodies, e.g. AA 3004 or AA3003, differ significantly in composition, and in the manufactured can, the end and body are essentially inseparable and that an economical recycle system requires the use of the entire can. U.S. Pat. No. 4,269,632 further notes that the recycling of cans results in a melt composition which differs significantly from the compositions of both the conventional can end and can body alloys. In this patent, it is suggested that both can end and body be fabricated from the same alloy to obviate the recycling problem. With respect to can ends and bodies made from AA5182 and 3004, it is indicated that normally pure aluminum must be added regardless of the alloy prepared.

In view of these problems with recycling metal containers, such as aluminum beverage containers having components thereof comprised of different alloys, it would be advantageous to have a method which would permit recovery of the containers by segregating the components thereof according to their alloys or segregating the components according to their alloy type. That is, by segregation of the components prior to melting, the components can be melted and refabricated in accordance with normal procedures without, inter alia, expensive dilutions or purification steps.

SUMMARY OF THE INVENTION

An object of this invention is to provide a method for recovering used metallic articles having components thereof comprised of different alloys.

Another object of the present invention is to provide a method for recovering metal containers.

Yet another object of the present invention is to provide a method for recovering containers such as beverage containers having components thereof comprised of different alloys.

And yet another object of the present invention is to provide a method for recovering aluminum beverage containers having a body and lid comprised of different aluminum alloys.

These and other objects will become apparent from the drawings, specification and claims appended hereto.

In accordance with these objects, there is disclosed a method of detaching and segregating metallic components secured to metallic articles, the segregation being made in accordance with with alloy composition of the components. The method comprises the steps of providing articles having at least two components thereon comprised of different aluminum alloys and heating the articles to a temperature sufficiently high to initiate incipient melting of the component having the lowest incipient melting temperature. While the articles are held at the lowest incipient melting temperature of said aluminum alloy component, they are subjected to agitation sufficient to cause the aluminum alloy component having the lowest incipient melting temperature to fracture and detach itself from the article.

Thereafter, the fractured and detached components are segregated from the articles and recovered.

DETAILED DESCRIPTION OF THE PREFERRED EMBODIMENTS

Figure 1:
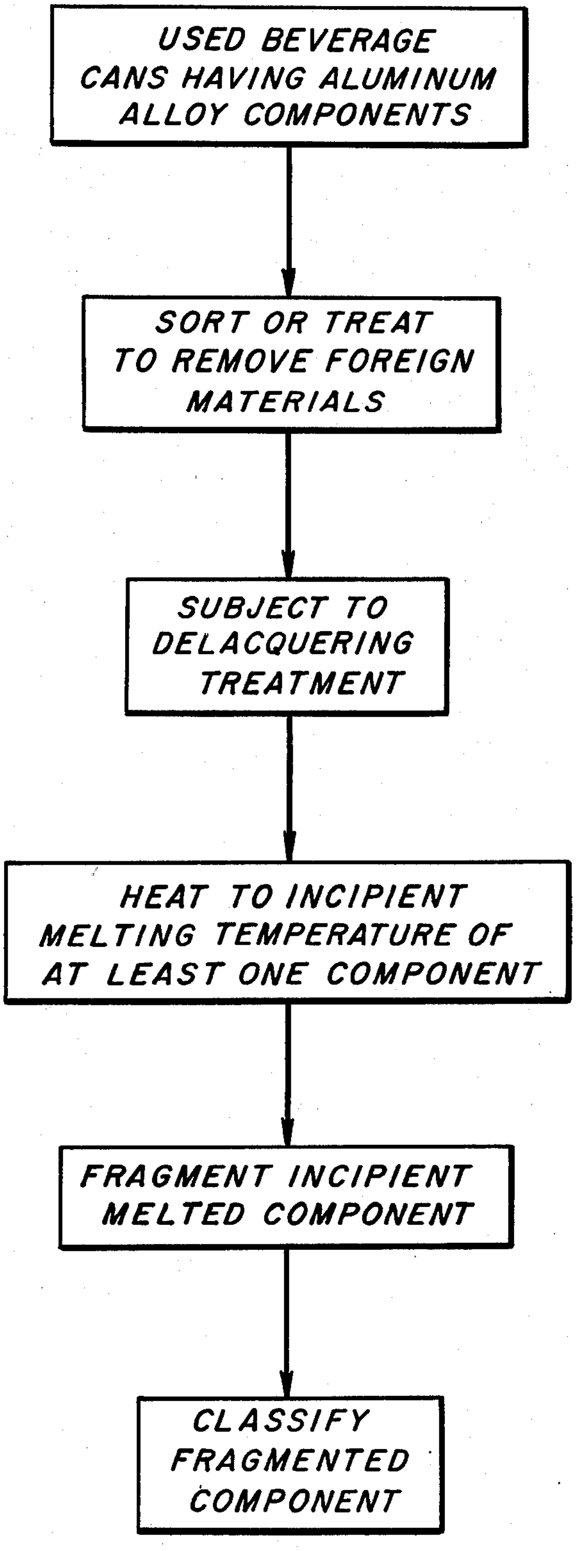
FIG. 1 is a flow sheet illustrating steps which can be used in classifying containers, such as used beverage containers.

Referring to the flow sheet, used articles from which the aluminum alloy components are to be recovered or reclaimed may comprise containers such as food and beverage containers. Containers to which the process is suited are used beverage containers comprised of two different aluminum alloys. From the flow sheet, it will be noted that the articles to be recovered may be subjected to preliminary sorting to remove materials which would contaminate the aluminum alloy to be recovered. For example, it would be desirable to remove glass bottles and steel cans such as used for food, for example. Further, it is desirable to remove other materials such as dirt and sand, etc., in order to cut down on the amount of silicon, for example, that can occur in the reclaimed alloy. Elimination of these materials can permit use of the alloy reclaimed in accordance with the present invention without further purification procedures. The removal of steel preliminarily, as may be present in the form of containers or cans or other sources, aids in keeping the iron in the reclaimed alloy to a level which does not adversely affect the reclaimed alloy properties.

When the materials to be reclaimed are food or beverage containers, these are normally packaged in bales for shipping purposes and, therefore, prior to the sorting step, the bales would normally be broken apart to remove the foreign materials.

After the sorting step, the containers can be subjected to a delacquering step. This may be accomplished by solvent or thermal treatments. The delacquering removes the coatings, such as decorative and protective coatings, which can contain elements such as titanium which in high levels is not normally desirable in the aluminum alloys being reclaimed. When solvent delacquering is used, it is usually desirable to shred or pierce the containers in order to permit the solvent to drain therefrom. When the coatings are removed by thermal treatments, the temperature used is normally in the range of 600° to 1000° F.

In the next step of the process, particularly where the containers are used beverage containers having bodies formed from Aluminum Association alloy (AA) 3004 and having lids formed from AA5182, for example, the containers are heated to a temperature at which the AA5182 lid becomes fracture sensitive. This temperature has been found to correlate closely with the incipient melting or grain boundary melting temperature of the alloy.

Thus, in reference to used beverage containers, this is the incipient melting teperature of AA5182. By the use of incipient melting or grain boundary melting temperature herein is meant the lower temperatures of the melting range or phase melting range and slightly below at which the alloy develops or significantly increases in fracture sensitivity or at which fragmentation of the alloy can be made to occur without the use of great force. That is, in the fracture sensitive condition, fragmentation can be made to occur by the use of a tumbling action or falling action, and the use of forces such as would be obtained by a hammer mill or jaw crushers are not required. Forces such as encountered with a hammer mill or jaw crusher are detrimental to the instant process since they act to crush the containers, for example, thereby trapping material to be separated. It will be appreciated that many alloys have different incipient melting temperatures. For example, AA3004 has an incipient melting temperature of about 1165° F. and AA5182 has an incipient melting temperature of about 1077° F. and has a phase melting range of about 1077° F. to 1178° F. However, it will be appreciated that this range can vary depending to a large extent on the exact composition of the alloy used. Incipient or grain boundary melting of the alloy greatly reduces its strength and sets up the fracture condition. Thus, the AA5182 lids can be detached or removed from the AA3004 bodies because of the lids being provided in a condition which makes it highly sensitive to fracture and fragmentation. While in this condition, energy, e.g. tumbling action, can be applied for purposes of detaching or removing the lid from the can body. The detaching results primarily from the lid fracturing or fragmenting to provide lid particles which are not only smaller than the can body but generally smaller than a lid.

Thus, after the detaching step, there results a charge or mass comprised of can bodies and fragmented lids, the can bodies being comprised of an alloy or material different from the fragmented lids, the fragmented lids having a particle size distribution substantially different from the can bodies. Thus, it can be seen that not only is it important to remove the lid from the can body, but the lid fragments must have a particle size which is substantially different from the can body. For purposes of obtaining a product or alloy which is not adversely contaminated with the alloy with which it is commingled, the charge is subjected to a treatment for purposes of classifying or segregating the particles. When this aspect of the process is carried out, the result is lid fragments or values comprised of substantially the same alloys which are segregated from the can bodies.

While the process has been described in general terms with respect to reclamation of used beverage cans, it should be understood that the feedstock for the process is not necessarily limited thereto. That is the process is capable of classifying aluminum alloys, particularly wrought alloys, where one of the alloys can be made fracture sensitive or put in a condition where one of the alloys can be fragmented preferentially in order to obtain a particle size distribution which is different from the particle sizes of the other alloys. In this way, a partition of the alloys can be made. Thus, for example, the feed stock for reclamation may be comprised of used beverage containers having bodies fabricated from AA3004 and lids fabricated from AA5182. Other alloys which may be used for lids include AA5082, 5052 and 5042 (Table X). However, other alloys which may be used for food or beverage can bodies include alloys such as AA3003, AA3104, AA5042 and AA5052 (Table IX). If such alloys are high in magnesium, for example, it is required that such can bodies be fractured or fragmented sufficiently to enable them to be classified with the lid alloys, such as AA5182. Thus, it will be understood that the process of the present invention is not only capable of removing and classifying lids from can bodies, as noted herein, but it is also capable of classifying the alloys in the can bodies with the lids when the alloys are of similar composition and which respond in a similar manner with respect to fracture or fragmentation characteristics, as explained herein.

In addition, where the containers have bodies and lids fabricated from the same alloy, that too may be reclaimed by classifying in accordance with the present invention. For example, if can body and lids are fabricated from sheet having the composition 0.1–1.0 wt.% Si, 0.01–0.9 wt.% Fe, 0.05–0.4 wt.% Cu, 0.4 to 1.0 wt.%

Mn, 1.3–2.5 wt.% Mg and 0–0.2 wt.% Ti, the remainder aluminum, this would be classified in accordance with the invention. That is, if the feed stock to be reclaimed, used containers comprising mixed alloys such as 3004, 5182, 5042, as well as the can body and lid alloy above, this alloy would be expected to be classified with the AA3004 body stock because no incipient melting would occur when the temperature was sufficiently high to cause fracture of AA5182 or AA5042.

Likewise, if steel containers having 5182 lid attached thereto are present in the feedstock, the lids can be classified in accordance with the invention and the steel bodies would be recovered with 3004 can bodies. The steel container bodies can be separated from the aluminum alloys with which they may be classified by magnetic separation means, for example, after the lids have been removed. If the steel bodied containers had lids which fractured at temperatures in the AA3004 incipient melting range, then it would be necessary to heat the containers to a higher temperature as compared to AA5182 to effect a separation of the lid from the steel body after which the steel bodies could be removed by magnetic separation, for example.

From the above, it will be seen that the process of the present invention is rather insensitive to the aluminum feedstock being recovered. That is, the process is capable of handling most types of aluminum alloys and is particularly suited to recovering and classifying wrought alloy products such as is encountered in used containers. If the scrap were comprised of aluminum alloys used in automobiles, for example, AA6009 and AA6010, as described in U.S. Pat. No. 4,082,578 herein incorporated by reference, where the use can be hoods and doors, etc., it may be desirable to subject such articles to a shredding action to provide a generally flowable mass. Or in recovering AA2036 and AA5182 from used automobiles, it may be desirable to shred such products and then effect a separation, as noted herein.

With respect to grain boundary melting or incipient melting of one of the aluminum alloy components to effect fracture sensitivity or fragmentation, it will be understood that this is an important step of the process and must be carried out with a certain amount of care. Using the used beverage cans as an example again, it will be noted that temperature control is important in this step. That is, if the temperature is permitted to get too high, substantial melting of the AA5182 lid can occur, which can result in losses with respect to aluminum and magnesium because of oxidation. Temperatures which bring about substantial melting of the metal normally should be avoided for the additional reason that it can result in coagulation of particles with molten aluminum to form a mass which is not readily flowable when compared to finer discrete particles. Further, molten aluminum can stick to the furnace and start building a layer of metal and particles therein which, of course, interferes with the efficiencies of the whole operation. Also, classification of the congealed mass becomes much more difficult, if not impossible. Lastly, on melting, fines such as sand, glass, dirt and pigments or contaminants such as silicon oxide, titanium oxide and iron oxide tend to become embedded in the molten metal, further making separation thereof difficult. Thus, in view of the above, it can be seen why temperatures which result in substantial melting of one of the aluminum alloy components should be avoided.

Likewise, when temperatures are employed which are too low, the fracture sensitivity of the lids drop dramatically and resistance to fragmentation increases substantially with the result that separation becomes extremely difficult and often segregation cannot be effected. Accordingly, it will be seen that it is important to have the temperature sufficiently high in order to remove the lid from the can body. For lids formed from AA5182, this temperature correlates to about the incipient melting temperature which is about 1077° F. The melting range for AA5182 is about 1077° to 1178° F. Thus, if the used beverage containers are heated to 1100° F., this is well below the melting range of AA3004 (about 1165°–1210° F.) and the lids can be detached or removed without fracturing the can bodies.

With respect to grain boundary or incipient melting, it will be understood that because the sheet from which the lids are fabricated has been rolled to a thin gauge, grains are not well defined. However, it is believed that recrystallization occurs when the used beverage containers are heated, for example, to remove lacquer, which can occur at 850° F., for example. Thus, grain boundary melting can occur.

When the used beverage containers were heated to about or slightly above 1100° F., generally it was found that the AA5182 ends sagged or slumped on the AA3004 can body. However, when the containers were agitated at about this temperature by permitting them to drop from a conveyor belt, for example, the lids were found to detach themselves from the can bodies and were divided or fragmented in small particles while the can bodies were relatively unchanged. Agitation sufficient to detach the ends also may be effected in a rotary furnace or kiln while the used cans are heated to a temperature in the range of 1077° to about 1155° F., with a preferred range being 1077° to 1130° F. and typically not higher than 1120° F. Agitation sufficient to remove the ends in the rotary furnace can be that which occurs at these temperatures when the cans are tumbled inside the furnace. As noted hereinabove, forces such as obtained from hammering or by the use of jaw crushers should not be used because they act to flatten the cans or otherwise entrap the fragmented ends with the can bodies. As noted earlier, operating at temperatures high in the melting range can result in too much liquid metal and the attendant problems therewith. The melting problem becomes particularly acute if the used beverage cans are held for a relatively long time at temperatures high in the melting range. At temperatures in the range of 1077° to 1130° F., the time at temperature can range from 30 seconds to less than 10 minutes.

In the classification step, the AA5182 fragments can be separated from whole can bodies or from can bodies which have been shredded by screening. However, it will be appreciated that other methods of separation may be used, all of which are contemplated to be within the purview of the present invention.

As further illustrative of the invention, used beverage cans having AA3004 bodies and AA5182 lids thereon were processed through a rotary-type kiln. Samples were taken of ingoing and exiting material for the rotary kiln at four different kiln set temperatures, as follows: 1060°, 1080°, 1100° and 1120° F. Ingoing samples were taken which weighed about 15 kg (35 lb). Approximately six minutes later, representing the residence time of used beverage cans in the kiln, about 45 kg (100 lb) of exiting material was sampled.

Prior to entering the furnaces, bales of used beverage cans were processed through a shredder. The shredder in the process of partially shredding most of the cans, generates some used beverage can fines. In the figures, the screen analyses of ingoing and exiting material are compared at each kiln set temperature to determine the degree to which end fragmentation occurs inside the kiln. This is recognized as a decrease in weight of the coarser fractions and an increase in weight of the finer fractions.

The U.S. Standard Screen sizes that were used to fractionate the samples are listed in Table I, together with the Tyler mesh equivalents.

Samples of each size fraction were melted and analyzed to monitor alloy partitioning and also to measure the amount of tramp impurity pickup.

The chemical composition of a sample makes it possible to calculate the relative amount of AA3004 and AA5182 present. This is done by assuming that AA3004 contains 1.10% manganese and that AA5182 contains 0.38% manganese. A melt of used beverage cans having a manganese content of 0.92% can be shown to contain 75% of AA3004 material and 25% of AA5182 material. This calculation was done for each exiting fraction at the four kiln temperatures of the test. The amount of AA5182 calculated to be present appears as the totally shaded portion on the bar graphs in FIGS. 2–5.

Figure 2:
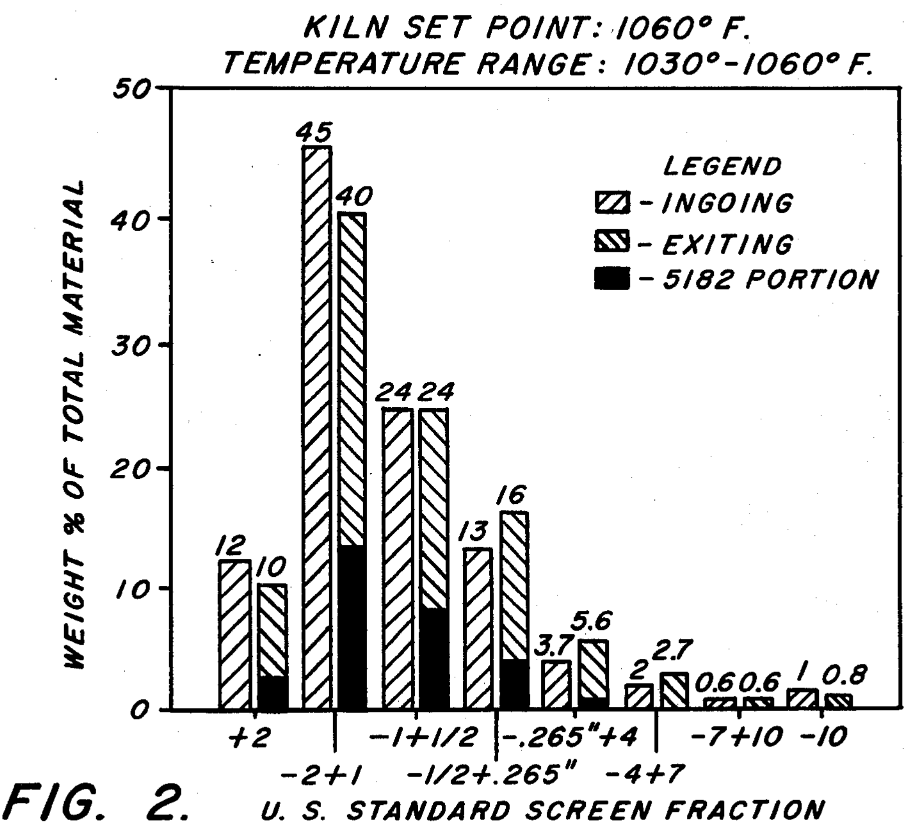
FIG. 2 is a bar graph showing the particle size distribution of material entering and exiting the furnace at a temperature of 1060° F.

FIG. 2 shows the particle size distribution of ingoing and exiting material while the kiln set temperature was 1060° F. The distribution of AA5182 in the exiting material is also shown. The recorded temperature during the sampling period ranged from 1030° to 1060° F. The primary feature in the figure is that very little difference is seen in the size distribution of ingoing and exiting material. It is also shown that the mix of AA5182 and AA3004 in the coarser exiting fractions is approximately 25% and 75%, respectively, which indicates that lid fragmentation did not appear to be occurring at this temperature.

Table II shows the spectrographic analysis of the metal found in each size fraction for both entering and exiting material. Again, ingoing and exiting material for a given size fraction appear to be very similar, except for magnesium.

There does, however, appear to be a variation in composition that is dependent on size fraction which suggests that the crushing step, prior to delacquering, generates more body fines than end fines. The finer fractions exhibit elevated manganese levels and decreased magnesium levels when compared to the coarser fracions. These finer fractions, therefore, appear to be richer in AA3004 content than the coarser ones. With the can body being thinner and accounting for a larger surface area of the can than the end, it may be expected that in shredding used beverage cans the body would produce more fines than would the end. The decreasing magnesium content with finer particle size may also reflect the increased magnesium oxidation incurred when melting the smaller sized material for analysis purposes. The −10 mesh material, both ingoing and exiting, did not contain sufficient metallic material to melt and produce a sample for spectrographic analysis.

Figure 3:
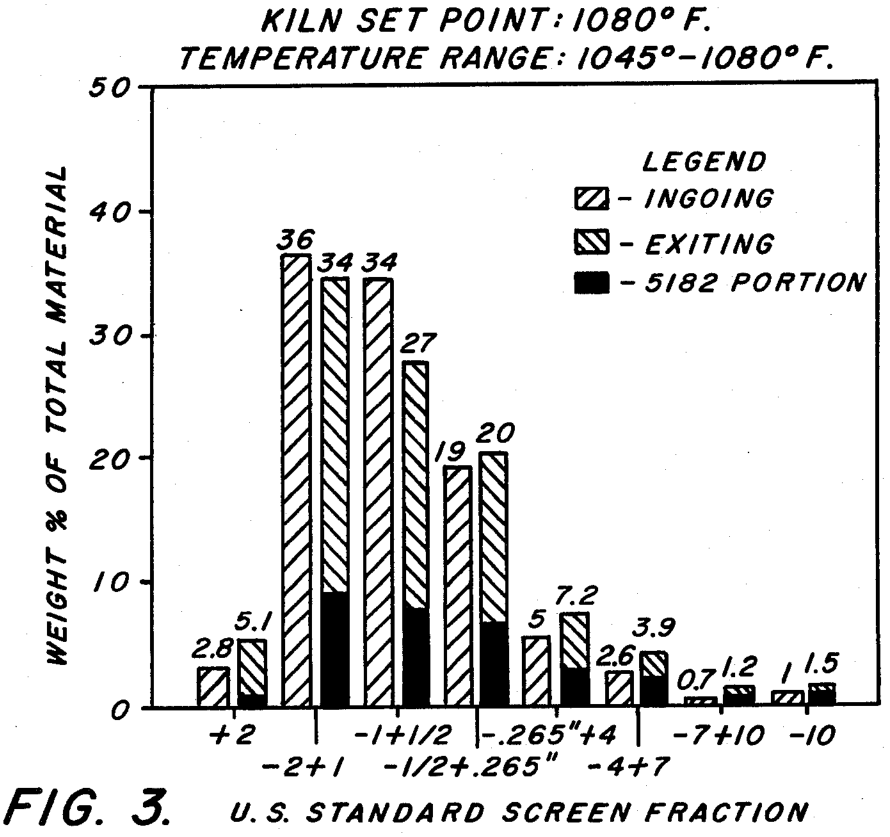
FIG. 3 is a bar graph showing the particle size distribution of material entering and exiting the furnace at a temperature of 1080° F.
Figure 4:
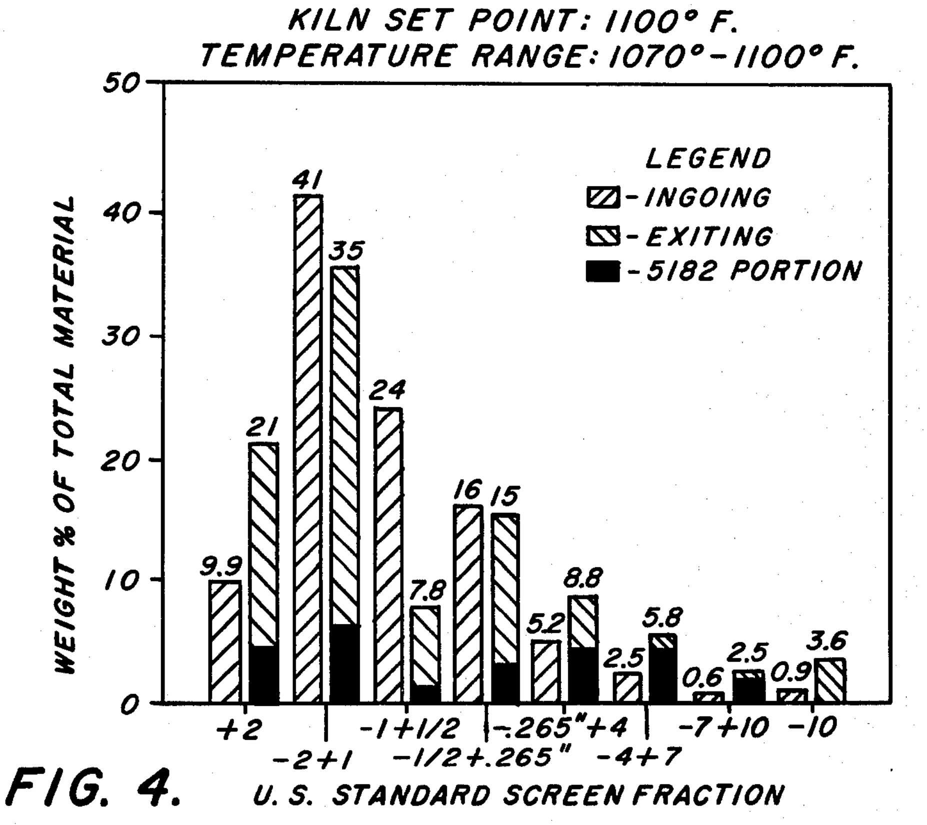
FIG. 4 is a bar graph showing the particle size distribution of material entering and exiting the furnace at a temperature of 1100° F.

The data from samples taken while the kiln set temperature was 1080° F. and 1100° F. appear in FIGS. 3 and 4 and Tables III and IV, respectively. These samples show fragmentation of AA5182 lids inside the rotary kiln. Specifically, the amount of material present in the finer mesh fractions in the exiting material is increased when compared to the ingoing material; and these fines have compositions that show AA5182 enrichment. This trend is more pronounded at 1100° than at 1080° F.

Figure 5:
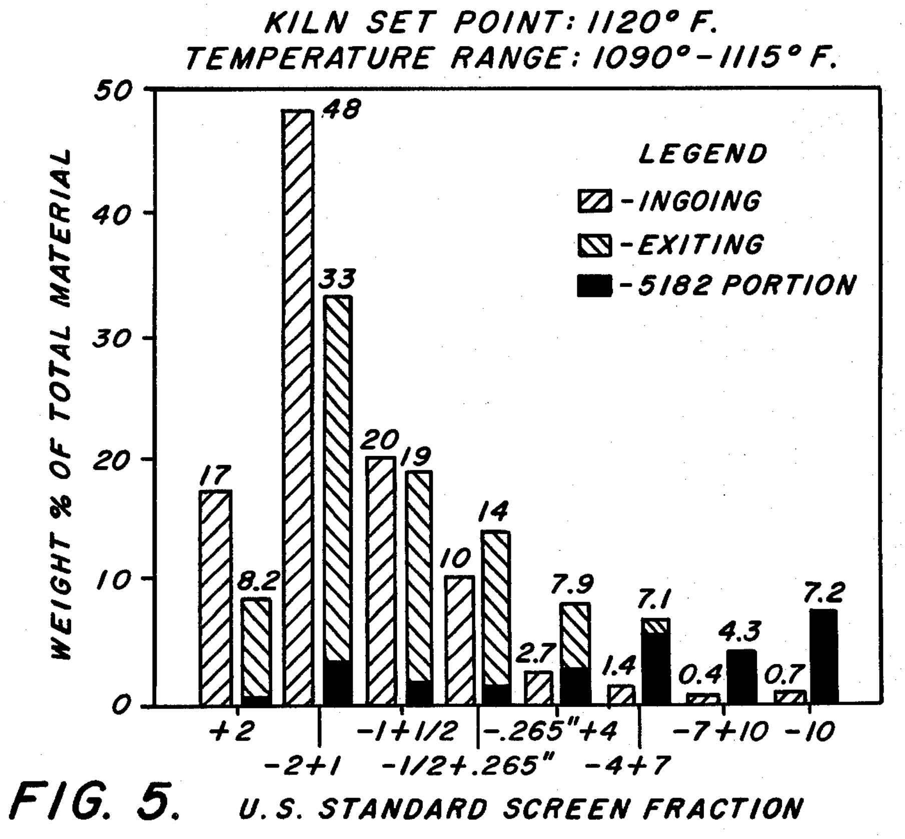
FIG. 5 is a bar graph showing the particle size distribution of material entering and exiting the furnace at a temperature of 1120° F.

The samples taken at 1120° F. show the strongest, definitive evidence for AA5182 fragmentation inside the kiln. The two coarsest fractions have experienced a significant weight reduction after passing through the kiln and the four finer fractions all show a significant weight increase (FIG. 5). The compositions of the fractions (Table V) show that the coarser fractions are nearly commercial grade composition of AA3004 and that the finer material is nearly the commercial grade composition of AA5182. Comparing data for the 1060° F. and 1120° F. experiments shows migration of AA5182 from the coarse fractions to the fine fractions.

Table V shows that metal from the −10 mesh fraction of the 1120° F. sample contains 0.50% silicon. This is very significant since this fraction represents approximately 30% of the AA5182 in the system. This material was further screened down to determine the possibility of screening out the tramp silicon contaminants. The results appear in Table VI. The tramp silicon apparently migrates to the −20 mesh fractions. The −25 mesh fraction contained such a large amount of non-metallic material that it could not be melted to prepare a sample for spectrographic analysis. Visual inspection revealed significant quantities of glass and sand. Chemical analysis of the −25 material appears in Table VII. This fraction contains only about 56% metallic aluminum. The sand and glass content is about 23 wt.%, and the tramp iron content about 1.7 wt.%. Discarding all −20 mesh material, to minimize tramp silicon and iron pickup, will contribute 2.2% to the system loss. However, this material contributes substantially to skim generation and should be removed prior to melting for this reason.

In a test utilizing whole cans, the used beverage containers were processed in a test apparatus at about 1110° F. The fragmented end pieces were 25.3% of the delacquered can weight. The body parts represented 74.7%. This suggests that the alloy separation was nearly 100% effective. The two portions were melted and analyzed. The spectrographic results appear in Table VIII which may be compared to AA5182 and AA3004 (See Tables IX and X). These analyses further support that 100% separation of the two alloys is possible when the starting material is whole cans.

TABLE I

Screens Used to Fractionate the Samples

| U.S. Standard Screen | Tyler Mesh Equivalent |
|---|---|
| 2 inches | 2 inches |
| 1 inch | 1 inch |
| 0.5 inch | 0.5 inch |
| 0.265 inch | 3 mesh |
| No. 4 | 4 mesh |
| No. 7 | 7 mesh |
| No. 10 | 9 mesh |
| No. 14 | 12 mesh |
| No. 18 | 16 mesh |
| No. 20 | 20 mesh |
| No. 25 | 24 mesh |

TABLE II

Chemical Analyses of Ingoing (IN) and Exiting (OUT) Material For Each Size Fraction. Kiln Set Temperature: 1060° F.

| U.S. Screen | Si | Fe | Cu | Mn | Mg |
|---|---|---|---|---|---|
| +2" | | | | | |
| IN | .17 | .41 | .11 | .90 | 1.19 |

TABLE II-continued

Chemical Analyses of Ingoing (IN) and Exiting (OUT) Material For Each Size Fraction. Kiln Set Temperature: 1060° F.

| U.S. Screen | Si | Fe | Cu | Mn | Mg |
|---|---|---|---|---|---|
| OUT | .17 | .41 | .11 | .91 | 1.23 |
| −2" + 1" | | | | | |
| IN | .17 | .41 | .11 | .92 | 1.22 |
| OUT | .18 | .40 | .10 | .86 | 1.20 |
| −1" + ½" | | | | | |
| IN | .16 | .38 | .10 | .85 | 1.72 |
| OUT | .16 | .39 | .11 | .86 | 1.02 |
| −½" + 0.265" | | | | | |
| IN | .17 | .41 | .11 | .91 | 1.19 |
| OUT | .17 | .40 | .11 | .92 | .78 |
| −0.265" + 4 | | | | | |
| IN | .21 | .41 | .12 | 1.00 | .73 |
| OUT | .24 | .42 | .12 | 1.01 | .78 |
| −4 + 7 | | | | | |
| IN | .37 | .45 | .14 | 1.06 | .35 |
| OUT | .26 | .45 | .13 | 1.05 | .68 |
| −7 + 10 | | | | | |
| IN | .24 | .44 | .13 | 1.06 | .26 |
| OUT | .24 | .48 | .13 | 1.03 | .54 |
| −10* | | | | | |
| IN | — | — | — | — | — |
| OUT | | — | — | — | — |

*Contained insufficient metal content for quantometer analysis.

TABLE III

Chemical Analyses of Size Fractions Exiting the Kiln at a Set Temperature: 1080° F.

| U.S. Screen | Si | Fe | Cu | Mn | Mg |
|---|---|---|---|---|---|
| +2" | .17 | .39 | .11 | .95 | .96 |
| −2" + 1" | .18 | .39 | .10 | .91 | 1.05 |
| −1" + ½" | .17 | .39 | .11 | .90 | 1.10 |
| −½" + 0.265" | .17 | .39 | .10 | .87 | 1.03 |
| −0.265" + 4 | .22 | .38 | .10 | .83 | 1.63 |
| −4 + 7 | .18 | .36 | .09 | .73 | 2.08 |
| −7 + 10 | .17 | .32 | .07 | .60 | 2.70 |
| −10 | .23 | .32 | .11 | .55 | 1.54 |

TABLE IV

Chemical Analyses of Size Fractions Exiting the Kiln at a Set Temperature: 1100° F.

| U.S. Screen | Si | Fe | Cu | Mn | Mg |
|---|---|---|---|---|---|
| +2" | .17 | .41 | .12 | .94 | .48 |
| −2" + 1" | .18 | .42 | .12 | .97 | .66 |
| −1" + ½" | .19 | .42 | .12 | .98 | .64 |
| −½" + 0.265" | .18 | .41 | .12 | .94 | .56 |
| −0.265" + 4 | .17 | .35 | .09 | .73 | 1.36 |
| −4 + 7 | .15 | .30 | .19 | .56 | 2.57 |
| −7 + 10 | .15 | .29 | .06 | .46 | 2.15 |
| −10* | — | — | — | — | — |

TABLE V

Chemical Analyses of Size Fractions Exiting the Kiln at a Set Temperature: 1120° F.

| U.S. Screen | Si | Fe | Cu | Mn | Mg |
|---|---|---|---|---|---|
| +2" | .19 | .44 | .13 | 1.05 | .58 |
| −2" + 1" | .18 | .43 | .12 | 1.02 | .66 |
| −1" + ½" | .18 | .44 | .12 | 1.03 | .67 |
| −½" + 0.265" | .18 | .43 | .12 | 1.02 | .57 |
| −0.265" + 4 | .21 | .37 | .10 | .82 | 1.61 |
| −4 + 7 | .17 | .30 | .07 | .52 | 2.97 |
| −7 + 10 | .18 | .25 | .05 | .36 | 3.43 |
| −10* | .50 | .29 | .07 | .36 | 3.35 |

TABLE VI

Chemical Analyses of Fractions Resulting From Further Fractionation of the Minus 10 Material Exiting the Kiln at Set Temperature 1120° F.

| U.S. Screen | wt. % | Si | Fe | Cu | Mn | Mg |
|---|---|---|---|---|---|---|
| −10 + 14 | 2.6 | .15 | .27 | .04 | .38 | 3.67 |
| −14 + 18 | 1.9 | .16 | .28 | .04 | .38 | 3.82 |
| −18 + 20 | 0.5 | .21 | .26 | .04 | .35 | 3.64 |
| −20 + 25 | 0.4 | .35 | .21 | .05 | .33 | 3.74 |
| −25* | 1.8 | — | — | — | — | — |

*Contained insufficient metal content for quantometer analysis.

TABLE VII

Analysis of Minus 25 Material Exiting the Kiln at a Set Temperature: 1120° F.

| | | |
|---|---|---|
| % Aluminum by Hydrogen Evolution | | 56.2% |
| Chemical Analysis: | Al | 56.7% |
| | Fe | 1.74% |
| | Si | 10.8% |
| Calculated | $SiO_2$ | 23.1 |
| % Magnetic Material | 1.87% | |
| X-ray Diffraction: | Aluminum | >10% |
| | Quartz | >10% |
| | MgO | <10% |
| | Unidentified | <10% |

TABLE VIII

Chemical Analyses from Whole Can Experiment Having 3004 Bodies and 5182 Ends

| | End Fragments | Body Parts |
|---|---|---|
| Si | 0.10 | 0.19 |
| Fe | .25 | .40 |
| Cu | .03 | .14 |
| Mn | .36 | 1.09 |
| Mg | 3.69 | .7 |
| Cr | .02 | .01 |
| Ni | .00 | .00 |
| Zn | .02 | .04 |
| Ti | .01 | .02 |

TABLE IX

| Alloy | Silicon | Iron | Copper | Manganese | Magnesium | Chromium | Zinc | Titanium | Others Each | Others Total |
|---|---|---|---|---|---|---|---|---|---|---|
| AA3003 | 0.6 | 0.7 | 0.05–0.2 | 1.0–1.5 | — | — | 0.10 | — | 0.05 | 0.15 |
| AA3004 | 0.30 | 0.70 | 0.25 | 1.0–1.5 | 0.8–1.3 | — | 0.25 | — | 0.05 | 0.15 |
| AA3104 | 0.6 | 0.8 | 0.05–0.25 | 0.8–1.4 | 0.1–1.3 | — | 0.25 | 0.10 | 0.05 | 0.15 |

Note:
In Table IX, the balance is aluminum, and composition is in wt. % max. unless shown as a range.

TABLE X

| Alloy | Silicon | Iron | Copper | Manganese | Magnesium | Chromium | Zinc | Titanium | Others Each | Others Total |
|---|---|---|---|---|---|---|---|---|---|---|
| AA5182 | 0.20 | 0.35 | 0.15 | 0.20–0.50 | 4.0–5.0 | 0.10 | 0.25 | 0.10 | 0.05 | 0.15 |
| AA5082 | 0.02 | 0.35 | 0.15 | 0.15 | 4.0–5.0 | 0.15 | 0.25 | 0.10 | 0.05 | 0.15 |

TABLE X-continued

| | | | | | | | | | Others | |
|---|---|---|---|---|---|---|---|---|---|---|
| Alloy | Silicon | Iron | Copper | Manganese | Magnesium | Chromium | Zinc | Titanium | Each | Total |
| AA5052 | 0.45 | Si + Fe | 0.10 | 0.10 | 2.2–2.8 | 0.15–0.35 | 0.10 | — | 0.05 | 0.15 |
| AA5042 | 0.20 | 0.35 | 0.15 | 0.20–0.50 | 3.0–4.0 | 0.10 | 0.25 | 0.10 | 0.05 | 0.15 |

Note:
In Table X, the balance is aluminum, and composition is in wt. % max. unless shown as a range.

While the invention has been described in terms of preferred embodiments, the claims appended hereto are intended to encompass other embodiments which fall within the spirit of the invention.

What is claimed is:

1. A method of fragmenting and segregating metallic components fabricated from different aluminum wrought alloys, the method comprising the steps of:

(a) providing a feedstock containing at least two components therein comprised of different aluminum wrought alloys having different incipient melting temperatures;

(b) heating the feedstock to a temperature sufficiently high to initiate incipient melting of the component having the lowest incipient melting temperature;

(c) subjecting said heated feedstock to agitation sufficient to cause said component having the lowest incipient melting temperature to fragment; and (d) segregating said fragmented components from the remaining feedstock.

2. The method in accordance with claim 1 where steps (b) and (c) are repeated until all components comprising said feedstock are separated from one another.

3. The method in accordance with claim 1 including using feedstock comprised of used food and beverage containers.

4. The method in accordance with claim 3 including sorting the feedstock prior to heating to remove contaminants including glass and steel containers.

5. The method in accordance with claim 3 including treating the feedstock to remove lacquers, decorative and protective coatings.

6. The method in accordance with claim 1 including using tumbling action of the feedstock to cause the component having the lowest incipient melting temperature to fragment.

7. The method in accordance with claim 1 wherein the feedstock contains containers having a body portion fabricated from AA3004.

8. The method in accordance with claim 1 wherein the feedstock contains containers having body portions fabricated from an aluminum alloy selected from the group comprising AA3003, AA5042, AA3004, AA3104, AA5052 and have ends on said containers fabricated from an aluminum alloy selected from the group comprising AA5182, AA5082, AA5052 and AA5042.

9. The method in accordance with claim 1 wherein the fragmented component has a particle size generally smaller than the remainder of the feedstock.

10. The method in accordance with claim 1 including recovering the fragment components.

11. The method in accordance with claim 1 wherein the feedstock contains containers having bodies and lids fabricated from sheet having the composition 0.1–1.0 wt.% Si; 0.01–0.9 wt.% Fe, 0.05–0.4 wt.% Cu, 0.4 to 1.0 wt.% Mn, 1.3 to 2.5 wt.% Mg and 0–0.2 wt.% Ti, the remainder aluminum.

12. The method in accordance with claims 1, 7, 8 and 11 including shredding the feedstock prior to said heating.

13. The method in accordance with claim 1 including controlling the heating in step (b) to avoid substantial melting of the component having the lowest incipient melting temperature.

14. The method in accordance with claim 1 wherein the feedstock contains containers having body portions formed from AA3004 having ends thereon formed from AA5182.

15. The method in accordance with claim 14 including fragmenting and separating at least 50% of the AA5182 end material from the feedstock.

16. The method in accordance with claim 14 including fragmenting and separating at least 90% of the AA5182 end material from the feedstock.

17. The method in accordance with claim 1 wherein the feedstock is heated to a temperature in the range of 900° to 1155° F.

18. The method in accordance with claim 1 wherein the feedstock is heated to a temperature in the range of 1000° to 1155° F.

19. The method in accordance with claim 1 wherein the feedstock is heated to a temperature in the range of 1077° to 1155° F.

20. The method in accordance with claim 1 wherein the feedstock is heated to a temperature in the range of 1077° to 1200° F.

21. The method in accordance with claim 1 including maintaining the temperature of the feedstock in the range of 1000° F. to 1155° F. from about 15 seconds to several minutes.

22. The method in accordance with claim 1 including maintaining the temperature of the feedstock in the range of 1077° F. to 1120° F. from about 30 seconds to 15 minutes.

23. The method in accordance with claim 1 including providing feedstock prior to heating having particles therein of +2 mesh (Tyler Series).

24. The method in accordance with claim 1 including magnetically separating iron values from the remaining feedstock in step (d).

25. A method of fragmenting and segregating metallic components fabricated from different aluminum wrought alloys, the method comprising the steps of:

(a) providing a feedstock containing containers having body portions fabricated from AA3004 and having ends thereon fabricated from AA5182;

(b) heating the feedstock to a temperature sufficiently high to initiate incipient melting of said AA5182 ends;

(c) subjecting said feedstock to agitation sufficient to cause said ends to fragment and become detached from said bodies; and (d) segregating said fragmented ends from the remaining feedstock.

26. The method in accordance with claim 25 wherein the feedstock is heated to a temperature in the range of 1077° to 1155° F.

27. The method in accordance with claim 25 wherein the feedstock is heated to a temperature in the range of 1077° to 1200° F.

28. The method in accordance with claim 25 including maintaining the temperature of the feedstock in the range of 1077° F. to 1120° F. from about 30 seconds to 15 minutes.

29. The method in accordance with claim 25 including fragmenting and separating at least 50% of the AA5182 end material from the feedstock.

30. A method of separating and recovering aluminum ends from aluminum container bodies, the ends and the bodies fabricated from different aluminum wrought alloys, the method comprising the steps of:

(a) providing a feedstock containing containers having body portions fabricated from AA3004 and having ends thereon fabricated from AA5182;
(b) heating the feedstock to a temperature in the range of 1077° to 1200° F. for a time period in the range of 30 seconds to 15 minutes to initiate incipient melting of said AA5182 ends;
(c) subjecting said feedstock to tumbling action to cause said ends to fragment and become detached from said bodies; and
(d) separating said fragmented ends from the remaining feedstock.

31. A method of separating and recovering metallic components fabricated from different aluminum wrought alloys, the method comprising the steps of:

(a) providing a feedstock containing at least two types of components therein comprised of different aluminum wrought alloys having different incipient melting temperatures;
(b) heating the feedstock to a temperature sufficient to substantially increase the fracture sensitivity of at least one of said components to a level sufficient to cause fragmentation of said components upon agitation of the heated feedstock; and
(c) separating said fragmented component from the remainder of said feedstock.

32. The method of claim 31 wherein steps (b) and (c) are repeated until all components comprising said feedstock have been separated from one another.

33. The method in accordance with claim 31 including using feedstock comprised of used food and beverage containers.

34. The method in accordance with claim 33 including sorting the feedstock prior to heating to remove contaminants including glass and steel containers.

35. The method in accordance with claim 33 including treating the feedstock to remove lacquers, decorative and protective coatings.

36. The method in accordance with claim 31 including using tumbling action of the feedstock to cause the lowest incipient melting temperature to fragment.

37. The method in accordance with claim 31 wherein the feedstock contains containers having a body portion fabricated from AA3004.

38. The method in accordance with claim 31 wherein the feedstock contains containers having body portions fabricated from an aluminum alloy selected from the group conprising AA3003, AA5042, AA3004, AA3104, AA5052 and have ends on said containers fabricated from an aluminum alloy selected from the group comprising AA5182, AA5082, AA5052 and AA5042.

39. The method in accordance with claim 31 wherein the fragmented component has a particle size generally smaller than the remainder of the feedstock.

40. The method in accordance with claim 31 including recovering the fragment components.

41. The method in accordance with claim 31 wherein the feedstock contains containers having bodies and lids fabricated from sheet having the composition 0.1–1.0 wt.% Si, 0.01–0.9 wt.% Fe, 0.05–0.4 wt.% Cu, 0.4 to 1.0 wt.% Mn, 1.3 to 2.5 wt.% Mg and 0–0.2 wt.% Ti, the remainder aluminum.

42. The method in accordance with claim 31 including shredding the feedstock prior to said heating.

43. The method in accordance with claim 31 including controlling the heating in step (b) to avoid substantial melting of the component having the lowest incipient melting temperature.

44. The method in accordance with claim 31 wherein the feedstock contains containers having body portions formed from AA3004 and having ends thereon formed from AA5182.

45. The method in accordance with claim 44 including fragmenting and separating at least 50% of the AA5182 end material from the feedstock.

46. The method in accordance with claim 44 including fragmenting and separating at least 90% of the AA5182 end material from the feedstock.

47. The method in accordance with claim 31 wherein the feedstock is heated to a temperature in the range of 900° to 1155° F.

48. The method in accordance with claim 31 wherein the feedstock is heated to a temperature in the range of 1000° to 1155° F.

49. The method in accordance with claim 31 wherein the feedstock is heated to a temperature in the range of 1077° to 1155° F.

50. The method in accordance with claim 31 wherein the feedstock is heated to a temperature in the range of 1077° to 1200° F.

51. The method in accordance with claim 31 including maintaining the temperature of the feedstock in the range of 1000° F. to 1155° F. from about 15 seconds to several minutes.

52. The method in accordance with claim 31 including maintaining the temperature of the feedstock in the range of 1077° F. to 1120° F. from about 30 seconds to 15 minutes.

53. The method in accordance with claim 31 including magnetically separating iron values from the remaining feedstock in step (d).

54. A method of fragmenting and segregating metallic components fabricated from different aluminum wrought alloys, the method comprising the steps of:

(a) providing a feedstock containing containers having body portions fabricated from AA3004 and having ends thereon fabricated from AA5182;
(b) heating the feedstock to a temperature sufficiently high to initiate incipient melting of said AA5182 ends;
(c) subjecting said feedstock to agitation sufficient to cause said ends to fragment and become detached from said bodies; and
(d) segregating said fragmented ends from the remaining feedstock.

55. A method of separating and recovering metallic components fabricated from different aluminum wrought alloys, the method comprising the steps of:

(a) providing a feedstock containing at least two types of components therein comprised of different aluminum wrought alloys having different incipient melting temperatures;

(b) heating the feedstock to a temperature approximating about the incipient melting temperature of the component having the lowest incipient melting temperature to substantially increase the fracture sensitivity of said component;

(c) thereafter, subjecting said feedstock to agitation sufficient to cause one of the components to fragment; and (d) segregating said fragmented components from the remaining feedstock.

56. A method of detaching and segregating aluminum lids secured to an aluminum container body, the segregation being made in accordance with the alloy composition of the lid and body components, the method comprising the steps of:

(a) providing containers having lids thereon fabricated from an aluminum alloy having a composition different from the container body;

(b) heating the containers to a temperature sufficiently high to initiate incipient melting of one of the lids and the bodies;

(c) while at the incipient melting temperature, subjecting said containers to agitation sufficient to cause the lids to detach themselves from said bodies;

(d) segregating said detached lids from said bodies; and (e) recovering said segregated lids and bodies.

57. The method in accordance with claim 56 including shredding said containers prior to said heating.

58. In a method of reclaiming aluminum beverage containers having a body fabricated from aluminum alloy 3004 and having a lid secured to the body, the lid fabricated from aluminum alloy 5182, wherein the lid is segregated from the body, the method comprising the steps of:

(a) providing the beverage containers in a furnace;

(b) heating the containers to a temperature approximating about the incipient melting of the lid;

(c) while at the incipient melting temperature, subjecting said containers to agitation sufficient to cause said lids to fracture and detach from said containers thereby providing fractured lid portions having a size substantially smaller than said container bodies;

(d) segregating said lid portions from said container bodies; and (e) recovering said segregated lid portions and container bodies.

59. A method of detaching and segregating metallic components secured to metallic articles, the segregation being made in accordance with the alloy composition of the components, the method comprising the steps of:

(a) providing articles having at least two components thereon comprised of different aluminum alloys;

(b) heating the articles to a temperature sufficiently high to initiate incipient melting of the component having the lowest incipient melting temperature;

(c) while at the lowest incipient melting temperature of said aluminum alloy component, subjecting said article to agitation sufficient to cause said aluminum alloy component having the lowest incipient melting temperature to fracture and detach itself from said article;

(d) after fracturing and detaching, segregating said components from said articles; and (e) recovering said separated components.

* * * * *